United States Patent
Furuichi et al.

(10) Patent No.: US 8,108,102 B2
(45) Date of Patent: Jan. 31, 2012

(54) SPRUNG MASS VELOCITY ESTIMATING APPARATUS

(75) Inventors: Takashi Furuichi, Saitama (JP); Koji Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 837 days.

(21) Appl. No.: 12/046,753

(22) Filed: Mar. 12, 2008

(65) Prior Publication Data

US 2009/0132121 A1 May 21, 2009

(30) Foreign Application Priority Data

Mar. 13, 2007 (JP) ................................. 2007-062807

(51) Int. Cl.
*B60G 17/018* (2006.01)

(52) U.S. Cl. ..... 701/37; 280/5.5; 280/5.507; 280/5.517; 701/38

(58) Field of Classification Search ............... 188/266.4; 280/5.515, 5.5, 5.507, 5.514; 701/1, 29, 701/37, 38, 40, 48, 70

See application file for complete search history.

(56) References Cited

U.S. PATENT DOCUMENTS

| | | | | |
|---|---|---|---|---|
| 4,671,533 A * | 6/1987 | Asami et al. | ............... | 280/5.514 |
| 4,728,120 A * | 3/1988 | Buma et al. | ................ | 280/5.519 |
| 5,510,986 A * | 4/1996 | Williams | ......................... | 701/38 |
| 5,684,698 A * | 11/1997 | Fujii et al. | ....................... | 701/38 |
| 5,839,082 A * | 11/1998 | Iwasaki | ............................. | 701/38 |
| 5,987,367 A | 11/1999 | Ohsaku et al. | | |
| 6,208,920 B1 * | 3/2001 | Izawa et al. | ...................... | 701/36 |
| 2004/0128044 A1 * | 7/2004 | Hac | ................................ | 701/48 |
| 2005/0125131 A1 * | 6/2005 | Kato et al. | ....................... | 701/70 |
| 2005/0273241 A1 * | 12/2005 | Tsukasaki et al. | .............. | 701/70 |
| 2006/0006017 A1 * | 1/2006 | Tsukasaki et al. | ............. | 180/233 |
| 2006/0259225 A1 * | 11/2006 | Ono et al. | ........................ | 701/82 |

FOREIGN PATENT DOCUMENTS

JP 3098425 B2 8/2000

* cited by examiner

*Primary Examiner* — Khoi Tran
*Assistant Examiner* — Stephen Holwerda
(74) *Attorney, Agent, or Firm* — Arent Fox LLP

(57) ABSTRACT

A sprung mass velocity estimating apparatus used in a four-wheeled vehicle to estimate a sprung mass velocity of a point of a vehicle body corresponding to each wheel of the vehicle, includes a state quantity detecting unit which detects a state quantity of the vehicle, a base value calculating unit which calculates a sprung mass velocity base value for each of the four vehicle body points based on a detection result of the state quantity detecting unit by using a prescribed oscillation model, and a sprung mass velocity calculating unit which calculates the sprung mass velocity for each vehicle body point by mutually adjusting the sprung mass velocity base values for the four vehicle body points such that the four vehicle body points are located on a common flat plane.

1 Claim, 9 Drawing Sheets

Prior art

SPRUNG MASS VELOCITY ESTIMATING APPARATUS

CROSS-REFERENCE TO RELATED APPLICATION

This application claims the priority of Japanese Application No. 2007-062807, filed Mar. 13, 2007, the entire specification, claims and drawings of which are incorporated herewith by reference.

TECHNICAL FIELD

The present invention relates to a sprung mass velocity estimating apparatus used in automobile behavior control, and particularly relates to a sprung mass velocity estimating apparatus that can achieve highly precise estimation of a sprung mass velocity.

BACKGROUND OF THE INVENTION

In recent years, in a field of dampers (shock absorbers) used in a vehicle suspension system, various types of variable damping force dampers that can variably control the damping force in steps or continuously have been developed. When conducting the damping force control in an automobile equipped with a variable damping force damper, a sprung mass velocity of each wheel is used as an important control parameter. Because it is substantially impossible to directly detect the sprung mass velocity in a traveling automobile, it is common to detect a vertical acceleration of the vehicle body for each wheel by means of an acceleration sensor and estimate the sprung mass velocity from the detected acceleration according to an oscillation model (observer) (see U.S. Pat. No. 5,987,367, for example).

However, the sprung mass velocity estimated by the above method may not be necessarily highly accurate because there may be variation in the acceleration values detected by the acceleration sensors and/or the computation precision according to the oscillation model may not be sufficiently high. For example, when the estimated sprung mass velocities for the four wheels are represented by heights of points (VBfl, VBfr, VBrl and VBrr) at corresponding positions as shown in FIG. 9, the four points VBfl-VBrr should be in a same flat plane because they result from a dynamic motion of the vehicle body that is considered a rigid member, but they often are not because of the estimation inaccuracy and the plane passing the four points is distorted. Thus, if the damping force control were conducted using such inaccurately estimated sprung mass velocities as control parameters, an unnecessary bending force may be applied on the vehicle body and/or riding comfort or driving stability can be deteriorated.

BRIEF SUMMARY OF THE INVENTION

The present invention has been made to solve the above prior art problems, and a primary object of the present invention is to provide a sprung mass velocity estimating apparatus that can achieve highly precise estimation of sprung mass velocity with a simple structure.

According to the present invention, there is provided a sprung mass velocity estimating apparatus used in a four-wheeled vehicle to estimate a sprung mass velocity for each wheel of the vehicle, comprising: a state quantity detecting unit for detecting a state quantity of the vehicle; a base value calculating unit for calculating a sprung mass velocity base value for each of the four wheels based on a detection result of the state quantity detecting unit by using a prescribed oscillation model; and a sprung mass velocity calculating unit for calculating the sprung mass velocity for each wheel by mutually adjusting the sprung mass velocity base values for the four wheels.

According to such a structure, even when the accuracy of sprung mass velocity base values for the four wheels are low, it is possible to obtain relatively accurate sprung mass velocities, which can allow appropriate control of damping force. This advantageously contributes to avoiding an unnecessary bending force applied upon the vehicle body and preventing deterioration of riding comfort or driving stability.

Preferably, the sprung mass velocity calculating unit defines four points that are located at positions corresponding to those of the four wheels when seen in a vertical direction and have vertical heights corresponding to the respective sprung mass velocity base values, connects the four points with four straight line segments in a circumferential direction of the vehicle, and performs the mutual adjustment of the sprung mass velocity base values by using a flat plane containing a midpoint of each of the four straight line segments as a reference. Further preferably, the sprung mass velocities may be calculated as heights of points at which the flat plane intersects vertical straight lines passing points representing positions of the wheels.

In this way, the mutual adjustment of the sprung mass velocity base values can be carried out in relatively simple steps and this can facilitate the calculation in the control apparatus and thus lead to improved response of control.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
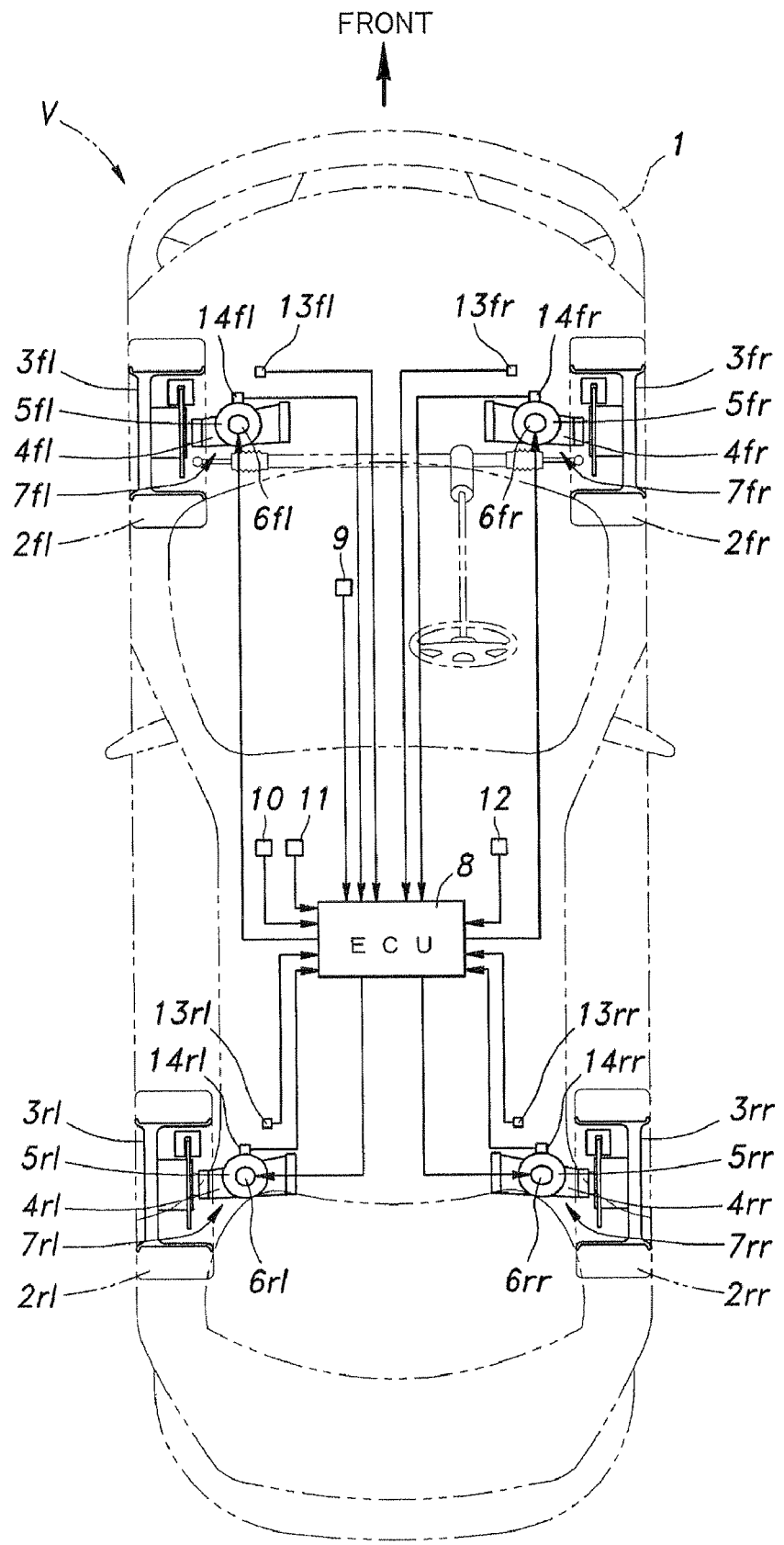
FIG. 1 is a general structural view of a four-wheeled automobile regarding an embodiment of the invention.
Figure 2:
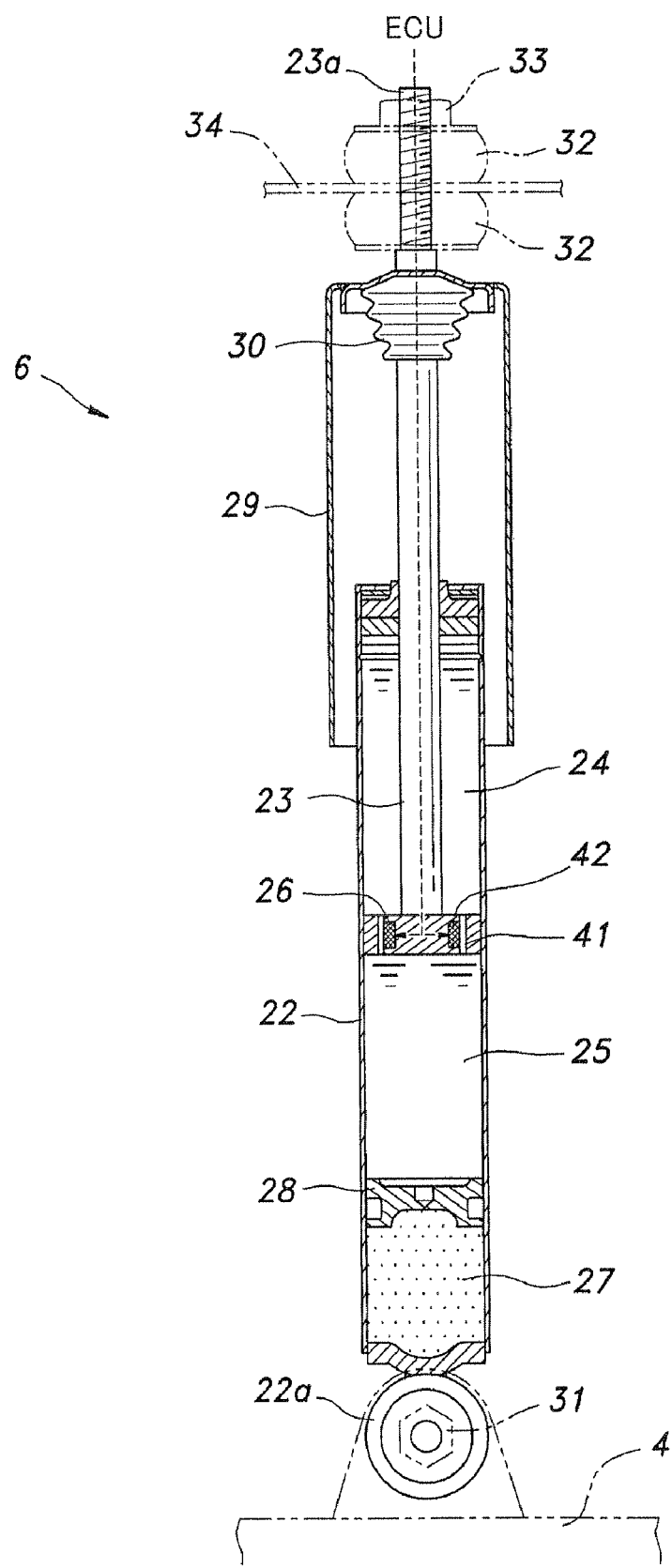
FIG. 2 is a longitudinal cross-sectional view of a damper regarding the embodiment.
Figure 3:
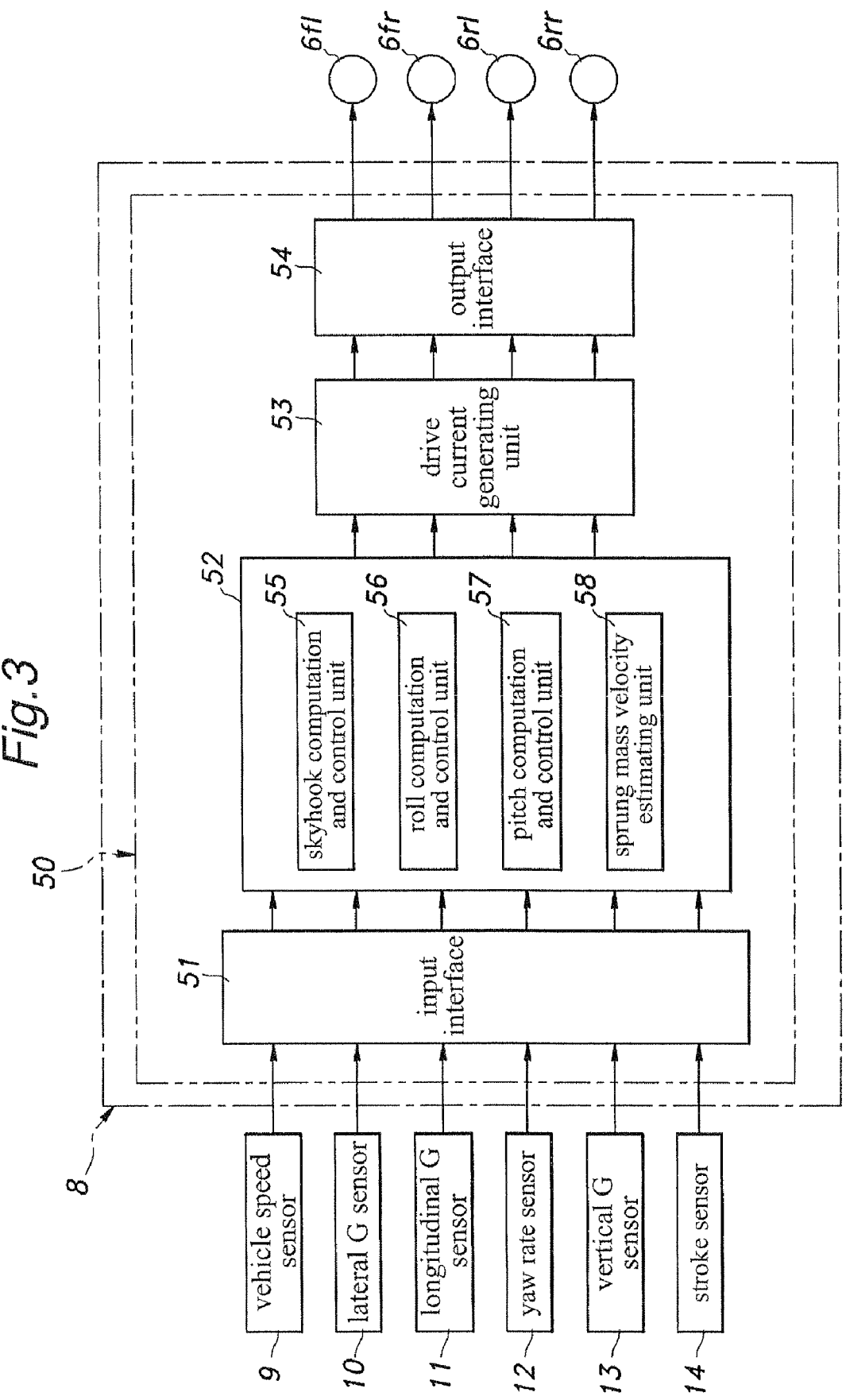
FIG. 3 is a block diagram showing a general structure of a damping force control device regarding the embodiment.
Figure 4:
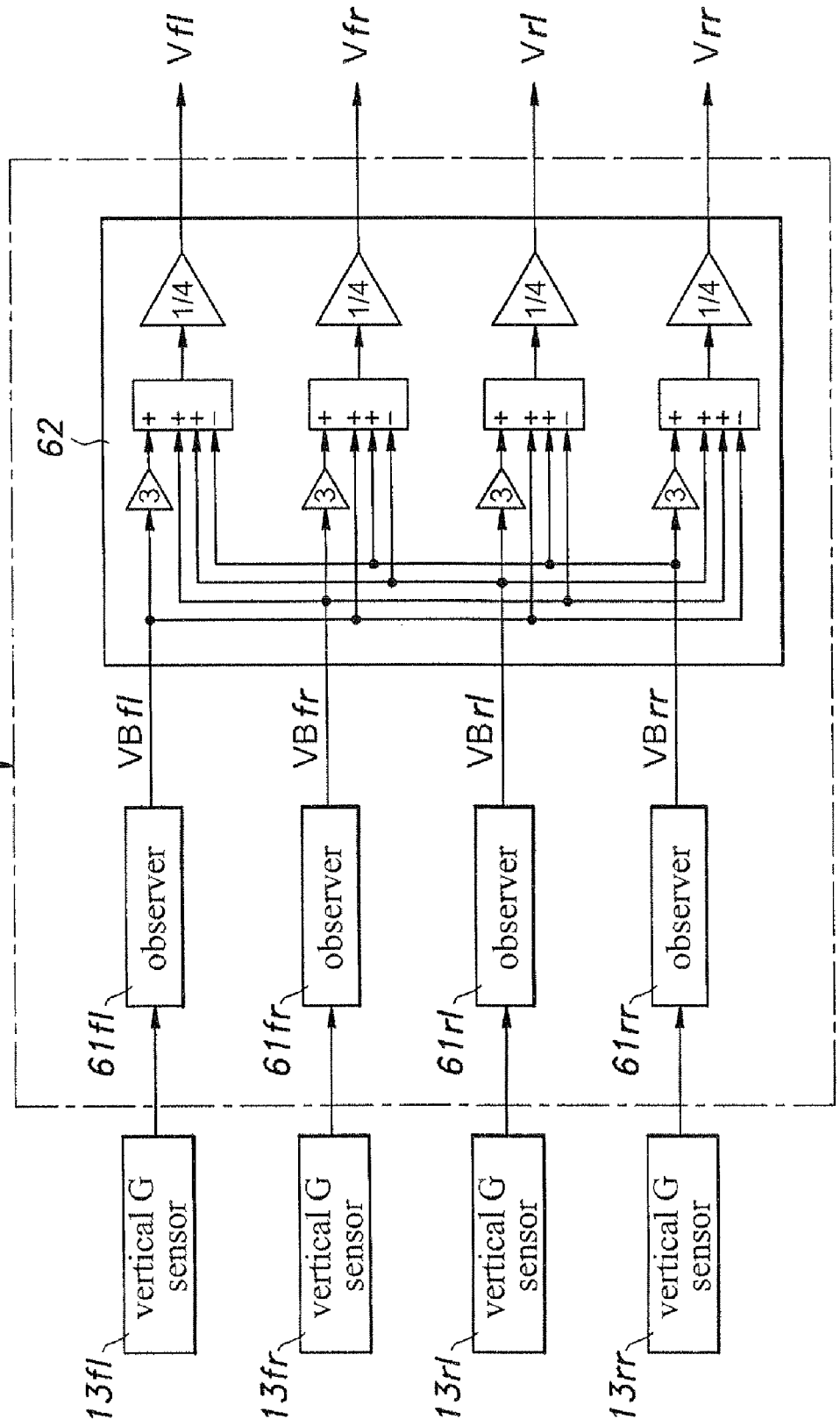
FIG. 4 is a block diagram showing a structure of an essential portion of a sprung mass velocity estimating unit regarding the embodiment.

Referring to the drawings, an embodiment of the present invention is described in detail hereinafter, in which the present invention is applied to a four-wheeled automobile. FIG. 1 is a general structural view of the four-wheeled automobile to which the present invention is applied, FIG. 2 is a longitudinal cross-sectional view of a damper regarding the embodiment, FIG. 3 is a block diagram showing a general structure of a damping force control device regarding the embodiment, and FIG. 4 is a block diagram showing a structure of an essential portion of a sprung mass velocity estimating unit regarding the embodiment.

<Structure of Embodiment>
<General Structure of Automobile>

First, with reference to FIG. 1, an explanation is made to a general structure of an automobile regarding an embodiment of the invention. It should be noted that in the following explanation, reference signs designating the four wheels and devices provided therefor comprise a number followed by a pair of alphabets indicating the position thereof. For example, the front left wheel is designated with "3$fl$", front right wheel is designated with "3$fr$", rear left wheel is designated with "3$rl$", and rear right wheel is designated with "3$rr$". When referring to the wheels as a whole, only the number (3) is used such as "wheels 3".

As shown in FIG. 1, the automobile (vehicle) V comprises four wheels 3 each of which is fitted with a tire 2, and each wheel 3 is suspended from a vehicle body 1 by means of a suspension 7 constituted by a suspension arm 4, spring 5, MRF-type variable damping force damper 6 (simply referred to as damper, hereinafter), and so on. The automobile V comprises an ECU (Electronic Control Unit) 8 for conducting various control and is also equipped with a vehicle speed sensor 9 for detecting a vehicle speed, a lateral G sensor 10 for detecting a lateral acceleration, a longitudinal G sensor 11 for detecting a longitudinal acceleration, a yaw rate sensor 12 for detecting a yaw rate, etc., which are disposed at appropriate locations of the vehicle body 1. Further, a vertical G sensor (state quantity detecting unit) 13 for detecting an up-down acceleration of a portion near a wheel house and a stroke sensor 14 for detecting an amount of stroke of the damper 6 are provided for each of the wheels 3$fl$-3$rr$. It should be noted that a stroke speed Ss can be obtained by differentiating the amount of stroke of the damper 6 detected by the stroke sensor 14, and thus the stroke sensor 14 can also serve as a stroke speed sensor.

The ECU 8 is constituted by a microcomputer, ROM, RAM, peripheral circuits, input/output interface, various driver circuits and so on, and is connected to the damper 6 of each wheel 3 as well as to the sensors 9-14 via a communication network, which in this embodiment consists of a CAN (Controller Area Network).

<Damper>

As shown in FIG. 2, the damper 6 of this embodiment is of a mono tube type (De Carbon type), and comprises a cylindrical cylinder 22 filled with an MRF (Magneto-Rheological Fluid), a piston rod 23 received in the cylinder 22 so as to be slidable in an axial direction, a piston 26 attached to an end of the piston rod 23 to partition the inner space of the cylinder 22 into an upper oil chamber 24 and a lower oil chamber 25, a free piston 28 that defines a high pressure gas chamber 27 in a lower part of the cylinder 22, a cover 29 for preventing dust from adhering to the piston rod 23 or the like, and a bump stop 30 for absorbing an impact in a full bound.

The cylinder 22 is connected to an upper surface of the suspension arm 4, which is a member on a wheel side, by means of a bolt 31 passed through an eye piece 22$a$ provided at a lower end of the cylinder 22. The piston rod 23 is provided with a stud 23$a$ at an upper end thereof, and the stud 23$a$ is connected to a damper base (wheel house upper portion) 34, which is a member on a vehicle body side, by means of upper and lower bushes 32 and a nut 33.

The piston 26 is formed with an annular connection passage 41 for connecting the upper oil chamber 24 and the lower oil chamber 25 to each other, and is provided with an MLV coil 42 disposed inward of the annular connection passage 41. When an electric current is supplied to the MLV coil 42 from the ECU 8, a magnetic field is applied to the MRF flowing through the annular communication passage 41 whereby ferromagnetic particles form chain-like clusters. As a result, an apparent viscosity of MRF flowing through the annular connection passage 41 increases, which in turn increases the damping force of the damper 6.

<General Structure of Damper Control Device>

As shown in FIG. 3, the ECU 8 includes a damping force control device 50 for controlling the damper 6. The damping force control device 50 is constituted by an input interface 51 to which the sensors 9-14 are connected, a damping force setting unit 52 for setting a target damping force of each damper 6 based on the signals (i.e., roll moment, pitch moment, etc.) detected by the sensors 9-13 as well as estimated sprung mass velocities, a drive current generating unit 53 for generating a drive current for each damper 6 (MLV coil 42) according to the target damping force input from the damping force setting unit 52, and an output interface 54 for supplying each damper 6 with the drive current generated by the drive current generating unit 53. The damping force setting unit 52 includes a skyhook computation and control unit 55 for conducting a skyhook control, a roll computation and control unit 56 for conducting a roll control, a pitch computation and control unit 57 for conducting a pitch control, and a sprung mass estimating unit (sprung mass estimating apparatus) 58 for estimating the sprung mass velocity for each wheel 3.

<Sprung Mass Velocity Estimating Unit>

As shown in FIG. 4, the sprung mass velocity estimating unit 58 comprises observers (base value calculating unit) 61$fl$-61$rr$ provided for the wheels 3$fl$-3$rr$, respectively, and a sprung mass velocity calculating unit 62. The observers 61$fl$-61$rr$ calculate sprung mass velocity base values VBfl-VBrr based on the detection values from the vertical G sensors 13$fl$-13$rr$, respectively, by using a single-wheel oscillation model formed by taking into account operational characteristics of the suspension 7. The sprung mass velocity calculating unit 62 calculates sprung mass velocities Vfl-Vrr by mutually adjusting the sprung mass velocity base values VBfl-VBrr.

<Function>
<Damping Force Control>

Figure 5:
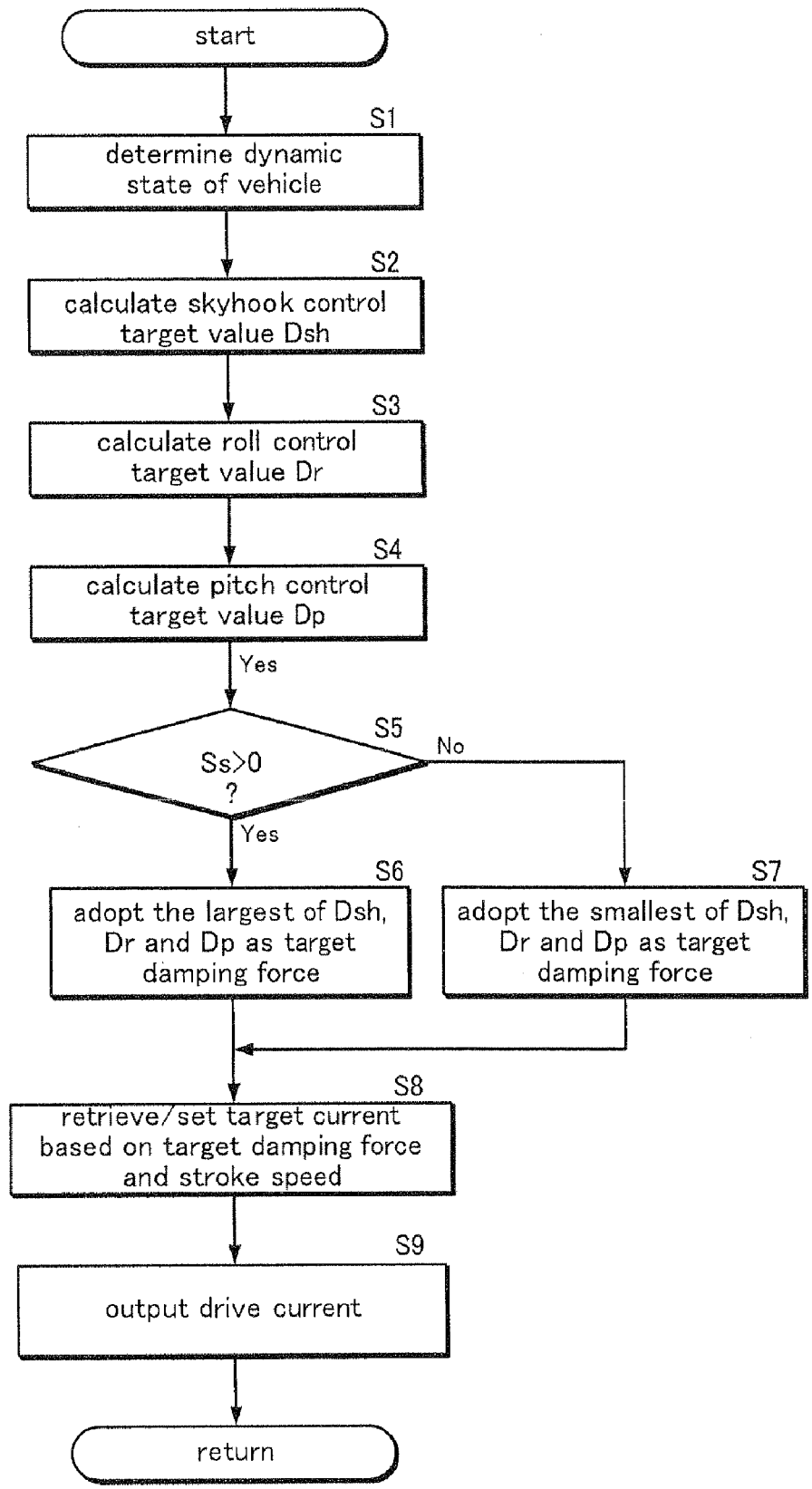
FIG. 5 is a flowchart showing the steps of damping force control regarding the embodiment.

When the automobile has started moving, the damping force control device 50 conducts a damping force control process as shown by the flowchart of FIG. 5 at predetermined processing intervals (e.g., every 10 ms). Upon start of the damping force control, in step S1, the damping force control device 50 determines a dynamic state of the automobile V (such as a sprung mass velocity for each wheel) based on the accelerations of the vehicle body 1 obtained by the lateral G sensor 10, longitudinal G sensor 11 and vertical G sensor 13, the vehicle speed input from the vehicle speed sensor 9, and a steering speed input from a steering angle sensor (not shown in the drawings). Then, the damping force control device 50 calculates a skyhook control target value Dsh, roll control target value Dr and pitch control target value Dp for each damper 6 in steps S2, S3 and S4, respectively.

Subsequently, the damping force control device 50 determines whether or not a stroke speed Ss of each damper 6 is positive in step S5, and if the determination result is "Yes" (i.e., the damper 6 is being expanded), sets the largest of the three control target values Dsh, Dr and Dp as a target damping force Dtgt in step S6. If the determination result in step S5 is "No" (i.e., the damper 6 is being contracted), the damping force control device 50 sets the smallest of the three control target values Dsh, Dr and Dp as the target damping force Dtgt in step S7.

Figure 6:
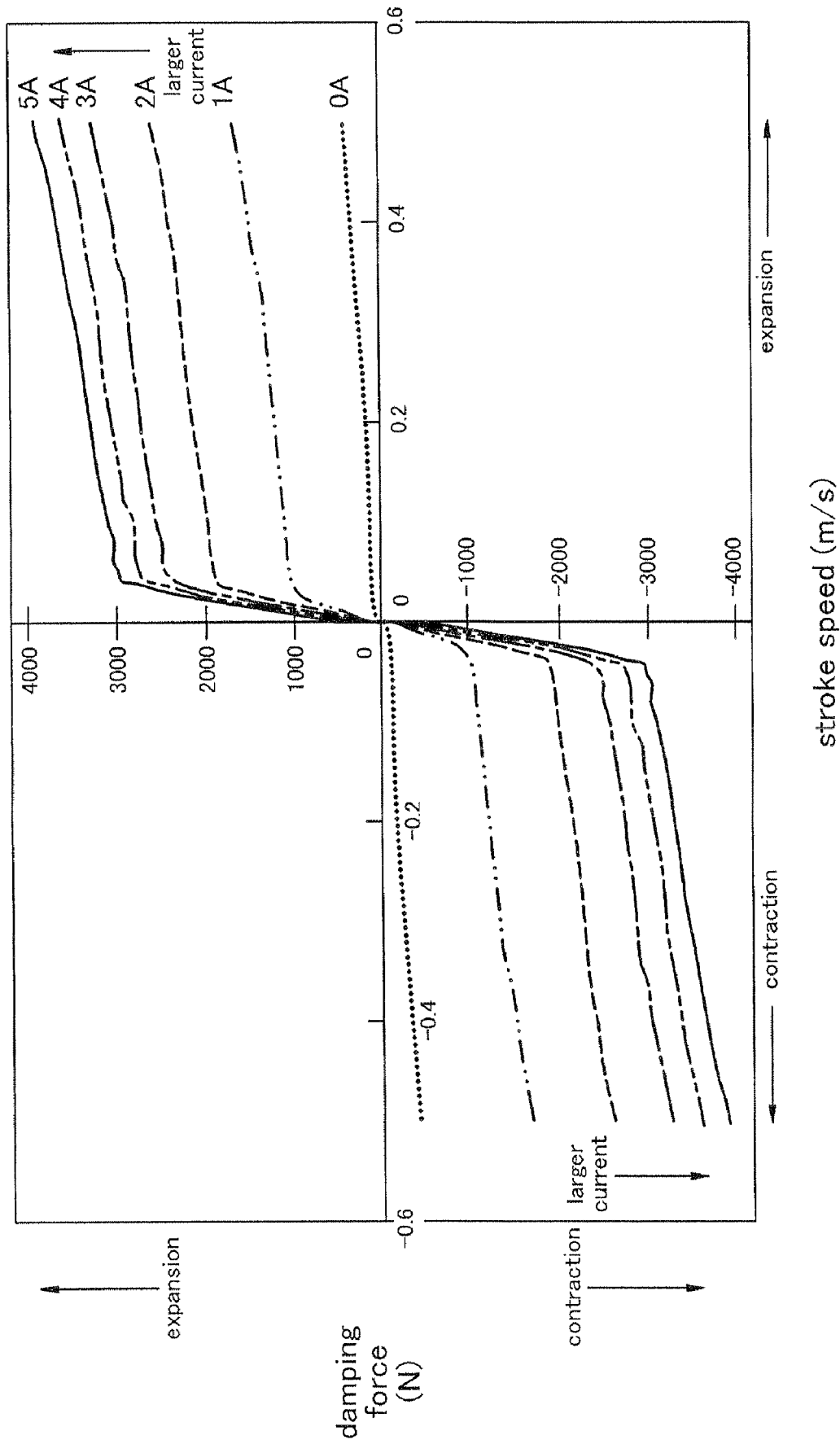
FIG. 6 is a drive current map regarding the embodiment.

After setting the target damping force Dtgt in step S6 or S7, the damping force control device 50 refers to a target current map of FIG. 6 in step S8 to retrieve/set a target current. Then, in step S9, the damping force control device 50 outputs a drive current to the MLV coil 40 of each damper 6 based on the target current set in step S8.

<Estimation of Sprung Mass Velocity>

Figure 7:
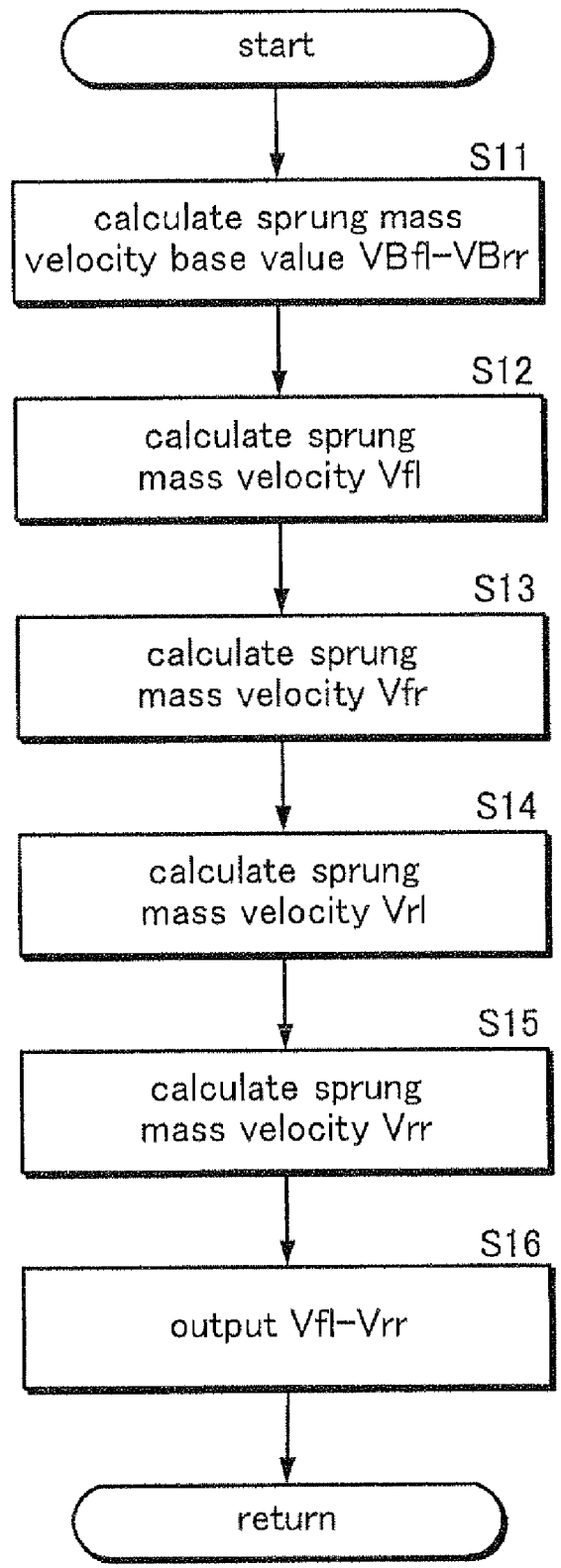
FIG. 7 is a flowchart showing the process for estimating the sprung mass velocities regarding the embodiment.

In parallel with the above described damping force control, the sprung mass velocity estimating unit 58 in the damping force control device 50 conducts a sprung mass velocity estimation process shown in a flowchart of FIG. 7 at prescribed process intervals. Upon start of sprung mass velocity estimation, the sprung mass velocity estimating unit 58 calculates the sprung mass velocity base values VBfl-VBrr for the wheels 3fl-3rr based on the vertical G sensors 13fl-13rr, respectively, in step S11 of FIG. 7.

Figure 8:
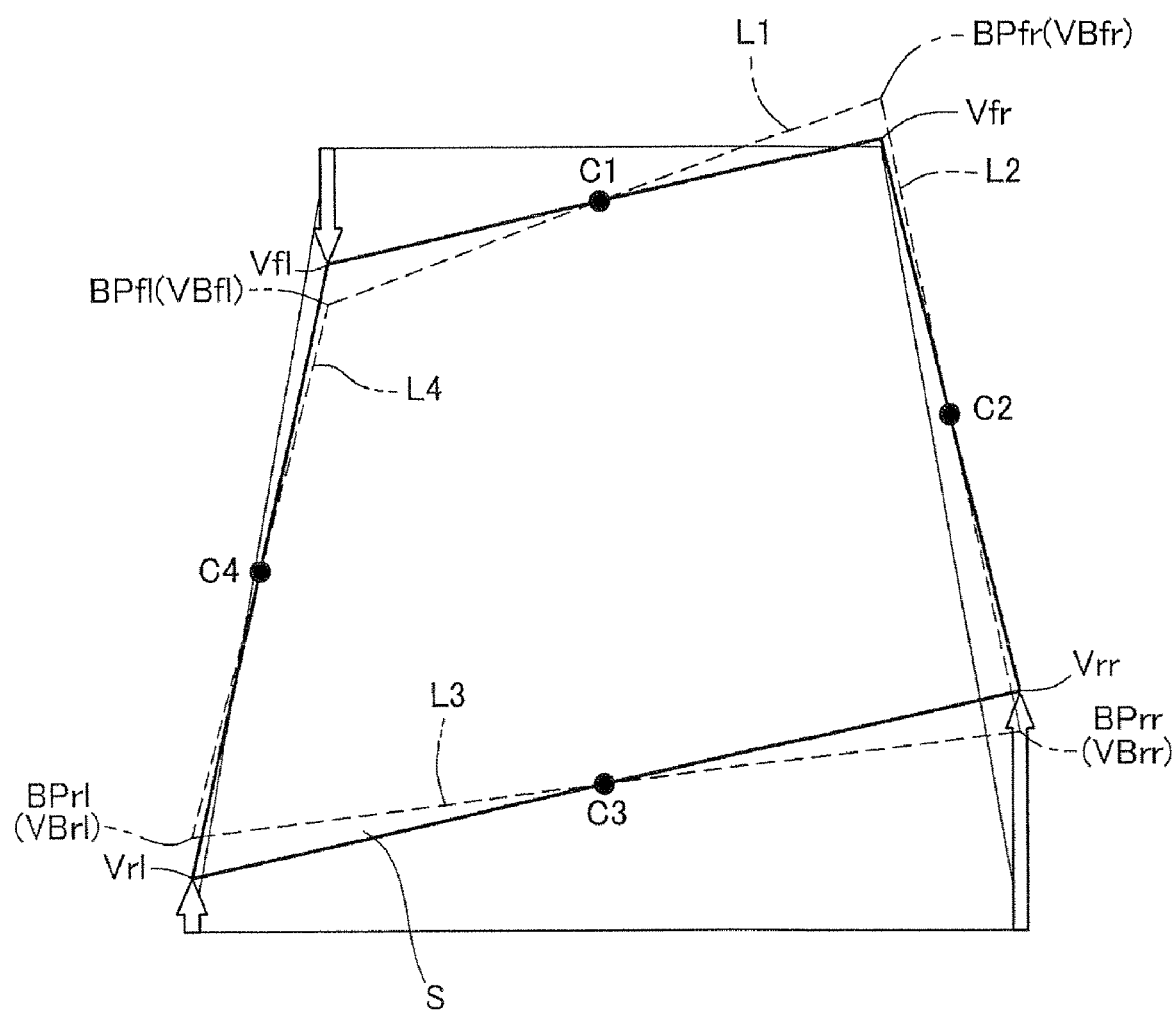
FIG. 8 is a schematic view showing a relative relationship among sprung mass velocities for the four wheels of an automobile regarding the embodiment.
Figure 9:
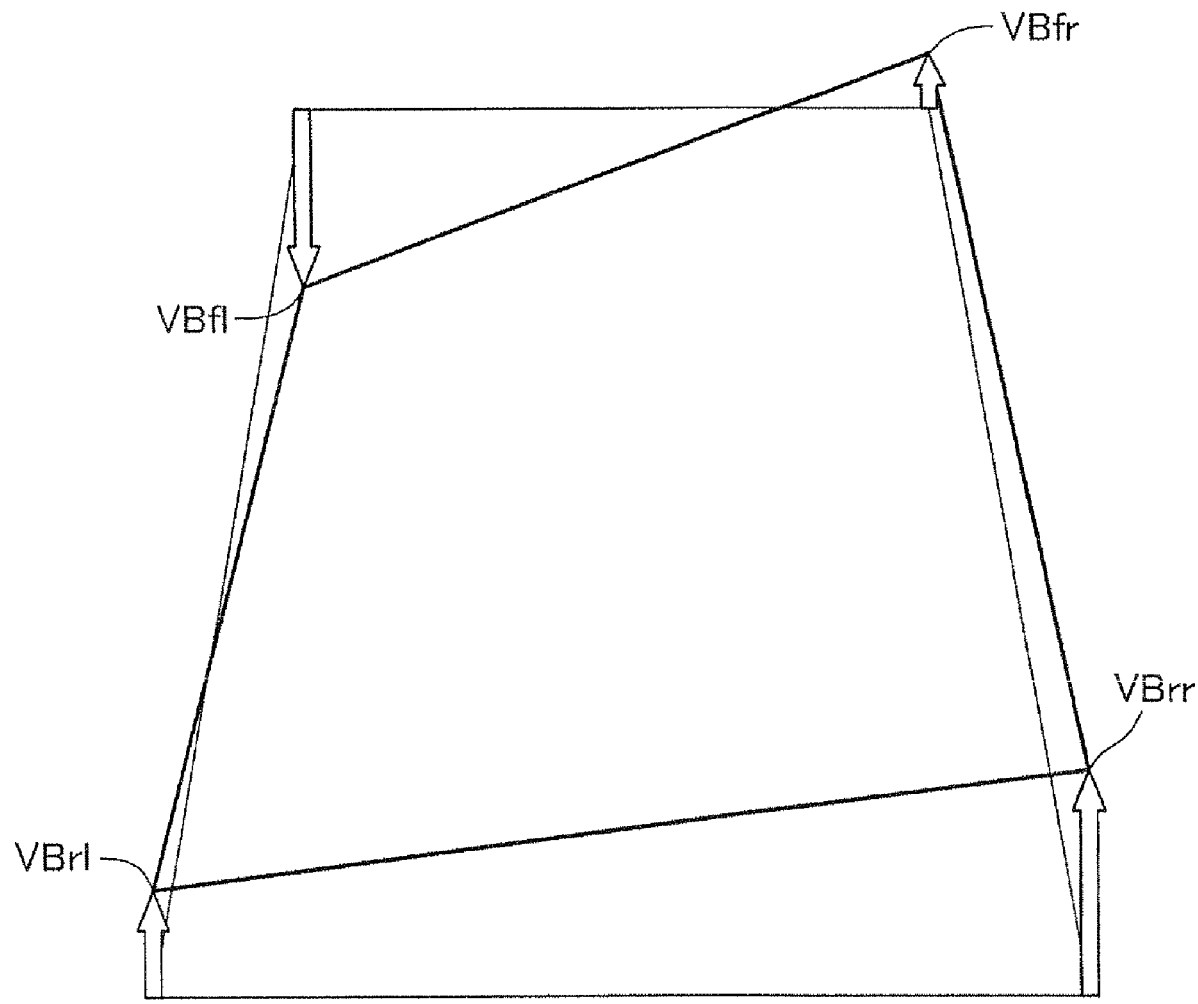
FIG. 9 is a schematic view showing a relative relationship among estimated sprung mass velocities for the four wheels of an automobile according to a conventional apparatus.

When the calculation of sprung mass velocity base values VBfl-VBrr is completed, the sprung mass velocity estimating unit 58 calculates the sprung mass velocities Vfl-Vrr for the wheels 3fl-3fr, respectively, in steps S12-S15. A concrete way of calculation of sprung mass velocities Vfl-Vrr is explained below with reference to FIG. 8, in which the sprung mass velocity base values VBfl-VBrr for the four wheels 3fl-3rr are represented by vertical heights of four points BPfl-BPrr located at positions corresponding to those of the wheels 3fl-3rr when seen in a plan view or in a vertical direction. First, the four points BPfl-BPrr are connected in a circumferential direction of the vehicle by four straight line segments L1-L4 (broken lines in FIG. 8) and a midpoint CP1-CP4 of each of the four line segments L1-L4 is determined. Then, a flat plane S that includes (or passes) these midpoints CP1-CP4 is obtained, and based on the flat plane S, the sprung mass velocity base values VBfl-VBrr are mutually adjusted by one another to provide the sprung mass velocities Vfl-Vrr for the wheels 3fl-3rr.

Specifically, in this embodiment, the sprung mass velocities Vfl-Vrr are calculated from the sprung mass velocity base values VBfl-VBrr by the following equations (1)-(4):

$$Vfl=(1/4)(3VBfl+VBfr+VBrl-VBrr) \quad (1)$$

$$Vfr=(1/4)(3VBfr+VBfl+VBrr-VBrl) \quad (2)$$

$$Vrl=(1/4)(3VBrl+VBfl+VBrr-VBfr) \quad (3)$$

$$Vrr=(1/4)(3VBrr+VBfr+VBrl-VBfl) \quad (4)$$

In other words, the sprung mass velocities Vfl-Vrr are calculated as heights of points where the plane S intersects vertical straight lines passing the points representing the positions of the wheels 3fl-3rr.

After the calculation of sprung mass velocities Vfl-Vrr, the sprung mass velocity estimating unit 58 outputs the sprung mass velocities Vfl-Vrr as estimated sprung mass velocities to the skyhook computation and control unit 55, roll computation and control unit 56, and pitch computation and control unit 57 in step S16.

In the present embodiment, owing to the above described structure, even when the sprung mass velocity base values VBfl-VBrr may contain errors due to the limit to detection accuracy of the vertical G sensor 13 and the like, the sprung mass velocity base values VBfl-VBrr are mutually adjusted to provide appropriate sprung mass velocities Vfl-Vrr. This can prevent the damping force control using the sprung mass velocities Vfl-Vrr as control parameters from generating unnecessary bending stress applied upon the vehicle body and deteriorating riding comfort or driving stability.

Although the present invention has been described in terms of preferred embodiment thereof, it is obvious to a person skilled in the art that various alterations and modifications are possible without departing from the scope of the present invention which is set forth in the appended claims. For example, in the above embodiment, a vertical G sensor was used as a state quantity detecting unit but a stroke sensor or the like may be used instead or in addition. Also, in the above embodiment, four points having heights corresponding to the sprung mass velocity base values are connected by four straight line segments in a circumferential direction of the vehicle body, and the plane containing the midpoints of these straight line segments was used as a reference in mutually adjusting the sprung mass velocity base values. However, it may be possible to mutually adjust the sprung mass velocity base values in other appropriate ways. In addition, the concrete structures of the control apparatus as well as the concrete steps of the control process may be modified or altered appropriately within the scope of the present invention.

The disclosure of the original Japanese patent application (Japanese Patent Application No. 2007-062807 filed on Mar. 13, 2007) on which the Paris Convention priority claim is made for the present application is hereby incorporated by reference in its entirety.

The invention claimed is:

1. A sprung mass velocity estimating apparatus used in a four-wheeled vehicle to estimate a sprung mass velocity of a point of a vehicle body corresponding to each wheel of the vehicle, comprising:
a state quantity detecting unit which detects a state quantity of the vehicle;
a base value calculating unit which calculates a sprung mass velocity base value for each of the four vehicle body points based on a detection result of the state quantity detecting unit by using a prescribed oscillation model; and
a sprung mass velocity calculating unit which calculates the sprung mass velocity for each vehicle body point by adjusting the sprung mass velocity base values for the four wheels vehicle body points such that the four vehicle body points are located on a common flat plane,
wherein the sprung mass velocities of the four vehicle body points are calculated from the sprung mass velocity base values according to the following formula;

$$Vfl=(1/4)(3VBfl+VBfr+VBrl-VBrr) \quad (1)$$

$$Vfr=(1/4)(3VBfr+VBfl+VBrr-VBrl) \quad (2)$$

$$Vrl=(1/4)(3VBrl+VBfl+VBrr-VBfr) \quad (3)$$

$$Vrr=(1/4)(3VBrr+VBfr+VBrl-VBfl) \quad (4)$$

where V denotes the sprung mass velocity, VB denotes the sprung mass velocity base value and suffices denote positions of the vehicle body points, fl, fr, rl and rr indicating front left, front right, rear left and rear right positions, respectively.

* * * * *